United States Patent
Brelid et al.

(10) Patent No.: US 12,049,727 B2
(45) Date of Patent: Jul. 30, 2024

(54) PROCESS FOR SEPARATION OF THE CELLULOSIC PART FROM A POLYESTER AND CELLULOSE COMPOSITION

(71) Applicant: Södra Skogsägarna Ekonomisk Förening, Växjö (SE)

(72) Inventors: Harald Brelid, Gothenburg (SE); Johannes Bogren, Kullavik (SE)

(73) Assignee: SÖDRA SKOGSÄGARNA EKONOMISK FÖRENING, Växjö (SE)

( * ) Notice: Subject to any disclaimer, the term of this patent is extended or adjusted under 35 U.S.C. 154(b) by 606 days.

(21) Appl. No.: 17/253,066

(22) PCT Filed: Jul. 8, 2019

(86) PCT No.: PCT/SE2019/050677
§ 371 (c)(1),
(2) Date: Dec. 16, 2020

(87) PCT Pub. No.: WO2020/013755
PCT Pub. Date: Jan. 16, 2020

(65) Prior Publication Data
US 2021/0269969 A1   Sep. 2, 2021

(30) Foreign Application Priority Data
Jul. 13, 2018 (SE) .................. 1850899-4

(51) Int. Cl.
*B29B 17/02* (2006.01)
*B29B 17/04* (2006.01)
(Continued)

(52) U.S. Cl.
CPC ............... *D21C 3/02* (2013.01); *B29B 17/02* (2013.01); *B29B 17/0412* (2013.01);
(Continued)

(58) Field of Classification Search
CPC ........... B29B 17/02; D21C 5/00; D21H 11/14
See application file for complete search history.

(56) References Cited

U.S. PATENT DOCUMENTS

| 3,317,519 A | 5/1967 | Lazarus et al. |
| 3,801,273 A | 4/1974 | Mays |

(Continued)

FOREIGN PATENT DOCUMENTS

| CN | 102199310 A | 9/2011 |
| CN | 102675089 A | 9/2012 |

(Continued)

OTHER PUBLICATIONS

Rydholm, Pulping Processes, 1965, Interscience Publishers, chapter 15. (Year: 1965).*
Handymath.com, the Complete Sodium Hydroxide Density-Concentration Table Calculator, downloaded online Dec. 20, 2023. (Year: 2023).*

(Continued)

*Primary Examiner* — Anthony Calandra
(74) *Attorney, Agent, or Firm* — MARSHALL, GERSTEIN & BORUN LLP

(57) ABSTRACT

A process for separation of the cellulosic part from a raw material composition comprising polyester and cellulose is provided. A blend is prepared comprising a raw material composition comprising polyester and cellulose and a hydrolyzing liquor wherein the hydrolyzing liquor comprises a first mixture comprising an alkaline solution containing hydroxide ions. The hydrolyzing liquor is added to give the blend an effective alkali concentration in a range from 5 g/l to 150 g/l, wherein the effective alkali concentration is calculated as NaOH, and the hydrolyzing liquor: raw material composition ratio is from 1.5:1 up to 25:1 and keeping the blend at a temperature of 100° C. or above.

10 Claims, 2 Drawing Sheets

(51) Int. Cl.
  *C08J 11/16* (2006.01)
  *D21C 3/02* (2006.01)
  *D21C 5/00* (2006.01)
  *D21H 11/14* (2006.01)

(52) U.S. Cl.
  CPC ............... *C08J 11/16* (2013.01); *D21C 5/00* (2013.01); *D21H 11/14* (2013.01); *B29B 2017/0224* (2013.01); *B29B 2017/0296* (2013.01); *B29B 2017/0484* (2013.01)

(56) References Cited

U.S. PATENT DOCUMENTS

| | | | |
|---|---|---|---|
| 4,345,039 | A | 8/1982 | Cowan et al. |
| 5,342,854 | A | 8/1994 | Serad |
| 5,395,858 | A | 3/1995 | Schwartz, Jr. |
| 2016/0304694 | A1 | 10/2016 | Rangaswamy et al. |
| 2018/0002837 | A1 | 1/2018 | Yu et al. |
| 2020/0232162 | A1* | 7/2020 | Harlin .................. D01F 2/00 |

FOREIGN PATENT DOCUMENTS

| | | |
|---|---|---|
| CN | 103613784 A | 3/2014 |
| CN | 105960489 A | 9/2016 |
| EP | 2922905 B1 | 6/2018 |
| JP | 2017503067 A | 1/2017 |
| WO | WO-2013182801 A1 | 12/2013 |
| WO | WO-2018115290 A1 | 6/2018 |
| WO | WO-2018115584 A1 | 6/2018 |

OTHER PUBLICATIONS

Smook, Handbook for Pulp and Paper Technologists, 1992, Angus Wilde Publications, 2nd edition, chapters 7 and 10. (Year: 1992).*
Extended European Search Report in corresponding Application No. 19833213.2, completed Apr. 14, 2022.
Search Report in corresponding Chinese Patent Application No. 2019800468883, dated Oct. 20, 2022.
Office Action in corresponding Chinese Patent Application No. 2019800468883, dated Oct. 26, 2022.
Search Report in Corresponding Chinese Application No. 2019800468883, dated Feb. 2, 2023.
B. B. Jagimansky, "Sulfate pulp cooking workers basic knowledge", Jagimansky, p. 23, Jan. 31, 1955.
International Search Report and Written Opinion in corresponding Application No. PCT/SE2019/050677 dated Aug. 27, 2019.
Negulescu, I. I. et al., "Recycling Cotton from Cotton/Polyester Fabrics", *Textile Chemist and Colorist*, vol. 30, No. 6, pp. 31-35 (1998).
Wan, Ben-Zu et al., "Kinetics of Depolymerization of Poly(ethylene terephthalate) in a Potassium Hydroxide Solution", *Ind. Eng. Chem. Res.*, vol. 40, No. 2, pp. 509-514 (2001).
Palme et al., "Development of an efficient route for combined recycling of PET and cotton from mixed fabrics", *Textiles and Clothing Sustainability*, vol. 3, No. 4, pp. 1-9 (2017).
Terry N. Adams, Editor, "Kraft Recovery Boilers" *Tappi Press*, pp. 226-229 (1997).
E. Sjöström, "Wood chemistry. Fundamentals and Applications" *Academic Press, Inc.*, pp. 43-46 (1981).

* cited by examiner

PROCESS FOR SEPARATION OF THE CELLULOSIC PART FROM A POLYESTER AND CELLULOSE COMPOSITION

TECHNICAL FIELD

The present invention relates to a process for separation of the cellulosic part from a raw material composition comprising polyester and cellulose containing composition, a cellulosic composition obtainable from the process for separation, a mixture comprising polyester hydrolysis products obtainable from the process for separation, a pulp, a dissolving pulp, a paper pulp, a regenerated cellulosic fibres product, and a paper product.

BACKGROUND ART

There are well-established systems for the material recycling of glass, metals, and paper. A major barrier to accomplish material recycling of more complex materials, such as textiles, is that textiles are a mix of materials.

Procedures for separation of cotton from cotton-polyester mixtures have been suggested. An example of such a process is described in U.S. Pat. No. 5,342,854 where polyester is dissolved in a sulfone solvent, and after dissolution, the solubilized polyester is separated from the cotton by e.g. filtration. The cotton material is apparently unaffected by the separation procedure However, such a process includes the usage of relatively large amounts of organic solvents, which may be an obstacle if implemented in industrial scale. An alternative strategy is to dissolve the cellulose part of cotton-polyester mixtures, see e.g. EP2922905B1. In that patent, it is suggested that cellulose in a blend containing synthetic fibre should be dissolved in a cellulose solvent and after separation from the synthetic fibres, present in solid form, the solution should be used for spinning of regenerated cellulose fibres.

Another way of accomplishing the separation of polyester from cotton that has been suggested is a process where the cellulose in the cotton-polyester is degraded by the action of acid. The polyester fibres are virtually unaffected by the treatment, whereas the cotton fibres are degraded into a fine powder, which can be separated from the polyester fibres, see U.S. Pat. No. 4,345,039. However, the harsh acid treatment will probably degrade the cellulose to a large extent and no attempts to evaluate the possibilities to use the isolated cellulose powder as a raw material for the production of regenerated cellulose fibres. Furthermore, the option to use the separated cellulose as paper pulp fibres is not retained, since the treatment results in a fine cellulose powder.

In Palme et al. "Textiles and Clothing Sustainability" (2017) 3:4, a process for separation of cotton and polyester from mixed textiles is described. In the process for separation in Palme et al., 5 to 15% by weight NaOH in water and a temperature in the range of between 70 and 90° C. were used for the hydrolysis of polyester. Addition of a phase transfer catalyst was shown to shorten the time for the hydrolysis of polyester. However, Palme et al. also showed that the separation can be performed without the phase transfer catalyst, but this required longer treatment times resulting in more cotton degradation. The suggested process, however, requires large amounts of sodium hydroxide. Sodium hydroxide requires a lot of energy to produce and is also costly, which makes it less suitable for industrial implementation. Furthermore, no strategy for the regeneration of alkali is presented, which makes the suggested process less sustainable.

Thus, there is a continuing high demand for further development of recycling technology of more complex materials, such as textiles.

DESCRIPTION OF THE INVENTION

The present invention relates a process for separation of the cellulosic part from a raw material composition comprising polyester and cellulose containing composition, wherein the process comprises
providing a blend, wherein the blend comprises a raw material composition and a hydrolyzing liquor,
wherein the raw material composition comprises a polyester composition,
wherein the polyester composition comprises 99%, or less, by weight of polyester and 1%, or more, by weight of cellulose containing component or components,
wherein the hydrolyzing liquor comprises a first mixture comprising an alkaline solution containing hydroxide ions,
the hydrolyzing liquor is added to give the blend an effective alkali concentration in a range from 5 g/l to 150 g/l, wherein the effective alkali concentration is calculated as NaOH, and
the hydrolyzing liquor:raw material composition ratio is from 1.5:1 up to 25:1, i.e. from 1.5 $dm^3$/kg up to 25 $dm^3$/kg, and
keeping the blend at a temperature of 100° C. or above, e.g. 110° C. or above, for example, 115° C. or above, e.g. 120° C. or above, for example, 125° C. or above, e.g. 130° C. or above, for example, 135° C. or above, or, e.g. 140° C. or above.

The present invention relates to a process for separation, as described herein, wherein the cellulosic part is in a solid phase, i.e. the cellulosic part is in a solid phase before, during, and also after, the process for separation, in accordance with the present invention.

The process for separation of the cellulosic part from a raw material composition comprising polyester and cellulose containing composition, in accordance with the present invention, as described herein, may be a continuous process, a batch process, or any combination of continuous processes or batch processes, and the process may comprise a step, or steps, being performed in a continuous reactor and/or in a batch reactor.

The process for separation, in accordance with the present invention, as described herein, may be incorporated in connection to an alkaline pulping process, such as the kraft process.

Further, the process for separation, in accordance with the present invention, as described herein, may be integrated into an alkaline pulping process, such as the kraft process.

The process for separation, in accordance with the present invention, as described herein, may be integrated into a kraft process.

The process for separation, in accordance with the present invention, as described herein, may suitably be integrated with production of kraft type dissolving pulp or paper pulp from lignocellulosic material.

The kraft process is a process for conversion of wood into wood pulp, which consists of cellulose fibers, the main component of paper. The kraft process entails treatment of wood chips with an aqueous mixture of sodium hydroxide (NaOH), and sodium sulfide (NaS$_2$), which, when dissolved give the active ions OH⁻ and HS⁻, that react with lignin in the wood material. This treatment degrades and solubilizes lignin leading to a liberation of the wood fibers. In the kraft process, the active cooking chemicals are added to the cook as "white liquor". The white liquor is a strongly alkaline solution mainly of sodium hydroxide, sodium sulfide and sodium carbonate, which is produced at the mill. At kraft and soda pulp mills, spent cooking liquor, referred to as black liquor is treated in the chemical recovery area. The chemical recovery process involves concentration of black liquor by evaporation to high dry content prior to combustion in the recovery boiler. The smelt of inorganics formed in the bottom of the boiler is then used for the preparation of fresh white liquor.

The process for separation, in accordance with the present invention, includes hydrolysis of polyester, and the hydrolysis of polyester may, for example, include step, or steps, of hydrolysis of polyester executed in a vessel, e.g. a digester.

In embodiments of the present invention, a process for separation, as described herein, is disclosed wherein the process for separation further comprises a step of physically separating, e.g. by filtering, the cellulosic part.

In still further embodiments of the present invention, a process for separation, as described herein, is disclosed wherein the process for separation further comprises a step of physically separating, e.g. by filtering and washing, the cellulosic part, whereby the cellulosic part of the raw material composition, as described herein, after the process for separation, also as described herein, is completely free, or substantially free, from any polyester and from any rests of polyester hydrolysis products.

Thus, the process for separation, in accordance with the present invention, may surprisingly work as a complete cleaning process for the cellulosic part, e.g. cotton, of the raw material composition, e.g. polycotton, as described herein, wherein the cellulosic part, of the raw material composition is completely cleaned from all polyester, of the raw material composition, and also from any rests of polyester hydrolysis products.

In embodiments of the present invention a process for separation, as described herein, is disclosed wherein the process further comprises step, or steps, of further purification of the cellulosic part, e.g. cotton.

The present invention also relates to a process for separation, as described herein, wherein the process for separation is a continuous process, a batch process, or any combination of continuous processes and batch processes, and/or the process, in accordance with the present invention, as described herein, comprises a step, or steps, being performed in a continuous reactor and/or in a batch reactor.

A further embodiment of the present invention relates to a process for separation, as described herein, wherein the process for separation is a continuous process.

Still a further embodiment of the present invention relates to a process for separation, as described herein, wherein the process for separation is a batch process.

A further embodiment of the present invention relates to a process for separation, as described herein, wherein the process for separation is any combination of continuous processes and batch processes.

Even further embodiments of the present invention relate to a process for separation, as described herein, wherein the process for separation comprises a step, or steps, being performed in a continuous reactor and/or in a batch reactor.

The process for separation, in accordance with the present invention, is a process for separation of the cellulosic part from a raw material composition comprising polyester and cellulose containing composition.

The raw material composition may, in accordance with the present invention, be one or more selected from polycotton composition, lignocellulosic composition, cellulose composition, regenerated cellulosic fibres composition, e.g. viscose composition, modal composition and/or lyocell composition, flax composition and cotton composition, with the proviso that the raw material composition comprises polyester. Further, the raw material composition, in accordance with the present invention may, or may not, have been subjected to any suitable pre-treatment process, before the process for separation of the present invention.

Furthermore, the raw material composition of the present invention may, if needed, be, subjected to any suitable pre-treatment process, before the process for separation of the present invention.

The cellulose containing component, or components, of the raw material composition, in accordance with the present invention, is/are selected from lignocellulosic composition, cellulose composition, regenerated cellulosic fibres composition, e.g. viscose composition, modal composition and/or lyocell composition, flax composition and cotton composition.

The polyester composition of the raw material composition, in accordance with the present invention, comprises polyester, such as polyethylene terephthalate (PET).

Further, the process for separation, in accordance with the present invention, comprises providing a blend, wherein the blend comprises a raw material composition and a hydrolyzing liquor, wherein the first mixture of the hydrolyzing liquor, in accordance with the present invention, comprises an alkaline solution containing hydroxide ions.

Furthermore, the process for separation, in accordance with the present invention, as described herein, comprises providing a blend, wherein the blend comprises a raw material composition and a hydrolyzing liquor, wherein the first mixture of the hydrolyzing liquor, in accordance with the present invention, comprises an aqueous alkaline solution containing hydroxide ions.

The term "alkaline solution" refers here to the basic hydroxide ion. The hydroxide ion is present in different compounds such as, but not limited to, NaOH and KOH. The concentration of alkali is here presented as NaOH regardless of counter ion. Further, the concentration of alkali may here be determined by titration according to SCAN N 30:8 and SCAN N 33:94. "The terms effective alkali and alkali may herein be used interchangeably".

Further, the hydrolyzing liquor is, in accordance with the present invention, added to give the blend an effective alkali concentration in a range from 5 to 150 g/l, wherein the effective alkali concentration is calculated as NaOH.

Further, the present invention does also relate to a process for separation, as described herein, wherein said effective alkali concentration is in a range from 10 to 140 g/l, e.g. from 15 to 130 g/l, for example, from 20 to 125 g/l, e.g. from 25 to 120 g/l, for example, from 30 to 115 g/l, e.g. from 35 to 110 g/l, or, for example, from 40 to 105 g/l.

Furthermore, the present invention does also relate to a process for separation, as described herein, wherein said effective alkali concentration is in a range from 10 to 80 g/l, e.g. from 15 to 90 g/l, for example, from 20 to 100 g/l, e.g. from 25 to 80 g/l, for example, from 30 to 90 g/l, e.g. from 35 to 80 g/l, or, for example, from 40 to 80 g/l.

Moreover, the process for separation, in accordance with the present invention, comprises providing a blend, wherein the hydrolyzing liquor:raw material composition ratio being from 1.5:1 up to 25:1, i.e. from 1.5 dm³/kg up to 25 dm³/kg.

Further, the process for separation, in accordance with the present invention, comprises providing a blend, wherein the blend has the hydrolyzing liquor:raw material composition ratio being from 1.5:1 up to 20:1, i.e. from 1.5 dm³/kg up to 20 dm³/kg.

Further, the present invention does also relate to a process for separation, as described herein, wherein said the blend has the hydrolyzing liquor:raw material composition ratio being from 2:1 up to 15:1, e.g. from 3:1 up to 10:1, for example, from 3.5:1 up to 8:1, or e.g. from 3:1 up to 8:1.

Furthermore, the present invention does also relate to a process for separation, as described herein, wherein said the blend has the hydrolyzing liquor:raw material composition ratio being from 1.5:1 up to 15:1, e.g. from 2:1 up to 10:1, for example, from 2.5:1 up to 8:1, or e.g. from 3.5:1 up to 8:1.

Furthermore, the process for separation, in accordance with the present invention, further comprises keeping the blend at a temperature of 100° C. or above, e.g. 110° C. or above, for example, 115° C. or above, e.g. 120° C. or above, for example, 125° C. or above, e.g. 130° C. or above, for example, 135° C. or above, or, e.g. 140° C. or above.

That the process for separation, in accordance with the present invention, comprises "keeping the blend at a temperature" means that the blend is allowed to have a lower temperature during a phase, or phases, when the temperature of the blend is increased to the temperature of the blend of the process for separation, all in accordance with the present invention.

Thus, "keeping the blend at a temperature" in accordance with the process for separation of the present invention, allows that the blend of the process for separation has said lower temperatures during a phase, or phases, when the temperature of the blend is increased to the temperature of the blend of the process for separation, all in accordance with the present invention.

Furthermore, embodiments of the process for separation, in accordance with the present invention, further comprises increasing the temperature of the blend of the process for separation in a controlled way to the desired hydrolyzing temperature.

The process for separation, in accordance with the present invention, has enabled "separation of the cellulosic part from a raw material composition comprising polyester and cellulose containing composition" in a surprisingly expedient and environment friendly way. By the process for separation, in accordance with the present invention, it has now been provided a "separation of the cellulosic part from a raw material composition comprising polyester and cellulose containing composition", which is fast and consumes less of sodium hydroxide. The sodium hydroxide requires a lot of energy to produce and is also costly, thus the fact that the "process for separation" in accordance with the present invention, is fast and consumes less of sodium hydroxide makes it also very suitable for industrial implementation.

The "process for separation" in accordance with the present invention is consequently well suited for implementation/integration in existing industrial production units. Such an integration will benefit from infrastructural supply of energy and chemicals, and there is also the possibility of further treating the cellulosic composition obtained from the process in existing post-treatment facilities, e.g. bleach plant and drying equipment, separately or together with the existing product at the production unit.

The present invention also relates to a process for separation, wherein the hydrolyzing liquor, as described herein, is added to give said blend a charge of effective alkali, wherein the charge of effective alkali is calculated as weight (in g) of effective alkali (EA)/(dry weight (in g) of said "raw material composition" (i.e. dry weight (in g) of said "polyester composition", and dry weight (in g) of any "further cellulose containing components")), and wherein the charge of effective alkali is not more than 100%, for example, not more than 90%, e.g. not more than 80%, or, for example, not more than 70%.

The present invention does also relate to a process for separation, as described herein, wherein the charge of effective alkali is not more than 100%.

Further, the present invention does also relate to a process for separation, as described herein, wherein the charge of effective alkali is not more than 80%.

The present invention does also relate to a process for separation, as described herein, wherein the charge of effective alkali is not more than 70%.

Further, the present invention does also relate to a process for separation, as described herein, wherein the charge of effective alkali is not more than 65%, for example, not more than 60%, e.g. not more than 55%, or, for example, not more than 50%.

The present invention does also relate to a process for separation, as described herein, wherein the charge of effective alkali is not more than 65%, or for example, not more than 60%.

Furthermore, the present invention does also relate to a process for separation, as described herein, wherein the charge of effective alkali is not more than 55%, for example, not more than 50%.

The present invention does also relate to a process for separation, as described herein, wherein the charge of effective alkali is not more than 50%.

Furthermore, the present invention does also relate to a process for separation, as described herein, wherein the charge of effective alkali is not more than 40%, for example, not more than 30%.

The present invention does also relate to a process for separation, as described herein, wherein the charge of effective alkali is not more than 30%.

In a practical application of the invention, when using a polycotton textile with ca 55% polyester, the minimum amount alkali charge needed is 25 to 30%, which means that one in an industrial application would prefer to add at least 30% EA.

The present invention does also relate to a process for separation, as described herein, wherein the charge of effective alkali is not lower than 2%.

Further, the present invention does also relate to a process for separation, as described herein, wherein the charge of effective alkali is not lower than 2%, for example, not lower than 3%, e.g. not lower than 4%, or, for example, not lower than 5%.

The present invention does also relate to a process for separation, as described herein, wherein the charge of effective alkali is not lower than 3%, or for example, not lower than 4%.

Furthermore, the present invention does also relate to a process for separation, as described herein, wherein the charge of effective alkali is not lower than 4%.

Further, the present invention does also relate to a process for separation, as described herein, wherein the charge of effective alkali is not lower than 5%, for example, not lower than 10%, e.g. not lower than 15%, or, for example, not lower than 20%.

The present invention does also relate to a process for separation, as described herein, wherein the charge of effective alkali is not lower than 15%, or for example, not lower than 20%.

In accordance with the present invention embodiments are disclosed wherein the raw material composition comprises a polyester composition, wherein the polyester composition comprises very small amounts of polyester and the rest of cellulose containing component or components.

For example, cotton textiles, e.g. a T-shirt, being 100% cotton, may comprise tags, hems, or other details, containing polyester, accordingly such "cotton textiles" comprising tags, hems, or other details, containing polyester is also a "polyester composition" in accordance with the present invention and with the "process for separation", as described herein.

Further, in accordance with the present invention embodiments are disclosed wherein the raw material composition comprises a polyester composition, wherein the polyester composition comprises 0.001 to 99% by weight of polyester and 99.999 to 1% by weight of cellulose containing component or components.

Furthermore, in accordance with the present invention embodiments are disclosed wherein the raw material composition comprises a polyester composition, wherein the polyester composition comprises 0.005 to 99% by weight of polyester and 99.995 to 1% by weight of cellulose containing component or components.

Further, in accordance with the present invention embodiments are disclosed wherein the raw material composition comprises a polyester composition, wherein the polyester composition comprises 0.01 to 99% by weight of polyester and 99.99 to 1% by weight of cellulose containing component or components.

Further, in accordance with the present invention embodiments are disclosed wherein the raw material composition comprises a polyester composition, wherein the polyester composition comprises 0.1 to 99% by weight of polyester and 99.9 to 1% by weight of cellulose containing component or components.

The present invention further relates to a process for separation, as described herein, wherein the raw material composition comprises a polyester composition, wherein the polyester composition comprises 99%, or less, by weight of polyester and 1%, or more, by weight of cellulose containing component or components, wherein the polyester composition is, for example, a polycotton composition and wherein the raw material composition further comprises zero, one or two, e.g. zero or one, of further cellulose containing components, for example, zero, one, or two, e.g. zero or one, of lignocellulosic composition, cellulose composition, regenerated cellulosic fibres composition, e.g. viscose composition, modal composition and/or lyocell composition, flax composition and cotton composition.

Further, the present invention also relates to a process for separation, as described herein, wherein the raw material composition comprises a polyester composition, wherein the polyester composition comprises 0.01 to 99% by weight of polyester and 99.99 to 1% by weight of cellulose containing component or components, wherein the polyester composition is, for example, a polycotton composition and wherein the raw material composition further comprises zero, one or two, e.g. zero or one, of further cellulose containing components, for example, zero, one, or two, e.g. zero or one, of lignocellulosic composition, cellulose composition, regenerated cellulosic fibres composition, e.g. viscose composition, modal composition and/or lyocell composition, flax composition and cotton composition.

Further, embodiments of a process for separation according to the present invention, as described herein, are disclosed, wherein the raw material composition comprises a polycotton composition, and wherein the raw material composition further comprises zero, or one, of further cellulose containing components, for example, of lignocellulosic composition, cellulose composition, regenerated cellulosic fibres composition, e.g. viscose composition, modal composition and/or lyocell composition, flax composition and cotton composition.

Embodiments of a process for separation according to the present invention, as described herein, are disclosed, wherein the raw material composition comprises a polycotton composition.

Further, the present invention also relates to a process for separation, as described herein, wherein the raw material composition comprises a polyester composition being, for example, a polycotton composition and wherein the raw material composition further comprises one, or two, of further cellulose containing components, for example, of lignocellulosic composition, cellulose composition, regenerated cellulosic fibres composition, e.g. viscose composition, modal composition and/or lyocell composition, flax composition and cotton composition; alternatively, the raw material composition comprises a polyester composition being, for example, a polycotton composition and one further of cellulose containing components, for example, of lignocellulosic composition, cellulose composition, regenerated cellulosic fibres composition, e.g. viscose composition, modal composition and/or lyocell composition, flax composition and cotton composition.

The present invention also relates to a process for separation, as described herein, wherein the raw material composition comprises a polyester composition being, for example, a polycotton composition and one further of cellulose containing component, for example, a lignocellulosic composition.

The lignocellulosic composition, as described herein, may, in accordance with the present invention, for example, comprise hardwood composition and/softwood composition, and/or, for example, bamboo composition and/or bagasse composition.

Further, in accordance with the present invention, embodiments are disclosed wherein the raw material composition comprises a polyester composition, wherein the polyester composition comprises 0.01 to 99% by weight of polyester and 99.99 to 1% by weight of cellulose containing component or components.

In further embodiments of the present invention, as described herein, the polyester composition comprises 0.01 to 95, e.g. 0.01 to 90, for example, 0.01 to 85, e.g. 0.01 to 80, for example, 0.01 to 75, e.g. 0.01 to 70, for example, 0.01 to 65, e.g. 0.01 to 60, or, for example, 0.01 to 58% by weight of polyester and 99.99 to 5, e.g. 99.99 to 10, for example, 99.99 to 15, e.g. 99.99 to 20, for example, 99.99 to 25, e.g. 99.99 to 30, for example, 99.99 to 35, e.g. 99.99 to 40, or, for example, 99.99 to 42% by weight of cellulose containing component or components.

In embodiments of the present invention, as described herein, the raw material composition comprises the polyester composition, as described herein, and zero, one, two or more of further, cellulose containing components, for example, zero, one, two or more, of lignocellulosic composition, cellulose composition, regenerated cellulosic fibres composition, e.g. viscose composition, modal composition and/or lyocell composition, flax composition and cotton composition.

In further embodiments of the present invention, as described herein, the raw material composition comprises the polyester composition, as described herein, and zero, one, or two, of further, cellulose containing components, for example, zero, one, or two, of lignocellulosic composition, cellulose composition, regenerated cellulosic fibres composition, e.g. viscose composition, modal composition and/or lyocell composition, flax composition and cotton composition.

In still further embodiments of the present invention, as described herein, the raw material composition comprises the polyester composition, as described herein, and zero or one, of further, cellulose containing components, for example, zero or one, of lignocellulosic composition, cellulose composition, regenerated cellulosic fibres composition, e.g. viscose composition, modal composition and/or lyocell composition, flax composition and cotton composition.

In even further embodiments of the present invention, as described herein, the raw material composition comprises the polyester composition, as described herein, and one of further, cellulose containing components, for example, one of lignocellulosic composition, cellulose composition, regenerated cellulosic fibres composition, e.g. viscose composition, modal composition and/or lyocell composition, flax composition and cotton composition.

In further embodiments of the present invention, as described herein, the raw material composition comprises the polyester composition, as described herein, and no further cellulose containing components.

In embodiments of the present invention, a process for separation, as described herein, is disclosed wherein the blend is kept at a temperature being 125° C. or above, e.g. 130° C. or above, for example, 135° C. or above, e.g. 140° C. or above, for example, 145° C. or above, e.g. 150° C. or above, for example, 155° C. or above, e.g. 160° C. or above, for example, 165° C. or above, or, e.g. 175° C. or above.

In an embodiment of the present invention, a process for separation, as described herein, is disclosed wherein the blend is kept at a temperature being 135° C. or above, or 140° C. or above.

In a further embodiment of the present invention, a process for separation, as described herein, is disclosed wherein the blend is kept at a temperature being 140° C. or above.

In embodiments of the present invention, a process for separation, as described herein, is disclosed wherein the blend is kept at a temperature being 200° C. or less, e.g. 195° C. or less, for example, 190° C. or less, e.g. 185° C. or less, or, for example, 180° C. or less.

In further embodiments of the present invention, a process for separation, as described herein, is disclosed wherein the blend is kept at a temperature being 195° C. or less, or 190° C. or less.

In a further embodiment of the present invention, a process for separation, as described herein, is disclosed wherein the blend is kept at a temperature being 180° C. or less.

In a further embodiment of the present invention, a process for separation, as described herein, is disclosed wherein the blend is kept at a temperature being at least 140° C. and at most 190° C.

In even a further embodiment of the present invention, a process for separation, as described herein, is disclosed wherein the blend is kept at a temperature being at least 140° C. and at most 200° C.

In a further embodiment of the present invention, a process for separation, as described herein, is disclosed wherein the blend is kept at a temperature being at least 135° C. and at most 190° C.

In even a further embodiment of the present invention, a process for separation, as described herein, is disclosed wherein the blend is kept at a temperature being at least 135° C. and at most 200° C.

In a further embodiment of the present invention, a process for separation, as described herein, is disclosed wherein the blend is kept at a temperature being at least 140° C. and at most 180° C.

In a further embodiment of the present invention, a process for separation, as described herein, is disclosed wherein the blend is kept at a temperature being at least 135° C. and at most 180° C.

In embodiments of the present invention, a process for separation, as described herein, is disclosed wherein the blend is kept at said temperature for at least 5 minutes, for example, at least 7 minutes, e.g. at least 10 minutes, for example, at least 15 minutes, e.g. at least 17 minutes, for example, at least 18 minutes, e.g. at least 19 minutes, or, for example, at least 20 minutes.

In further embodiments of the present invention, a process for separation, as described herein, is disclosed wherein the blend is kept at said temperature for at least 10 minutes or at least 15 minutes.

In embodiments of the present invention, a process for separation, as described herein, is disclosed wherein the blend is kept at said temperature for at least 15 minutes or at least 20 minutes.

In even further embodiments of the present invention, a process for separation, as described herein, is disclosed wherein the blend is kept at said temperature for at least 20 minutes.

In further embodiments of the present invention, a process for separation, as described herein, is disclosed wherein the blend is kept at said temperature for at least 15 minutes.

In embodiments of the present invention, a process for separation, as described herein, is disclosed wherein the blend is kept at said temperature for at least 10 minutes.

In further embodiments of the present invention, a process for separation, as described herein, is disclosed wherein the blend is kept at said temperature for at least 40 minutes or at least 50 minutes.

In embodiments of the present invention, a process for separation, as described herein, is disclosed wherein the blend is kept at said temperature for at least 35 minutes or at least 45 minutes.

In even further embodiments of the present invention, a process for separation, as described herein, is disclosed wherein the blend is kept at said temperature for at least 45 minutes.

In further embodiments of the present invention, a process for separation, as described herein, is disclosed wherein the blend is kept at said temperature for at least 30 minutes.

In embodiments of the present invention, a process for separation, as described herein, is disclosed wherein the blend is kept at said temperature for at least 25 minutes.

In embodiments of the present invention, a process for separation, as described herein, is disclosed wherein the blend is kept at said temperature for at most 600 minutes or at most 500 minutes.

In even further embodiments of the present invention, a process for separation, as described herein, is disclosed wherein the blend is kept at said temperature for at most 500 minutes.

In further embodiments of the present invention, a process for separation, as described herein, is disclosed wherein the blend is kept at said temperature for at most 450 minutes.

In embodiments of the present invention, a process for separation, as described herein, is disclosed wherein the blend is kept at said temperature for at most 400 minutes.

In embodiments of the present invention, a process for separation, as described herein, is disclosed wherein the blend is kept at said temperature for at least 10 minutes and at most 400 minutes.

In even further embodiments of the present invention, a process for separation, as described herein, is disclosed wherein the blend is kept at said temperature for at most 300 minutes.

In further embodiments of the present invention, a process for separation, as described herein, is disclosed wherein the blend is kept at said temperature for at most 250 minutes.

In embodiments of the present invention, a process for separation, as described herein, is disclosed wherein the blend is kept at said temperature for at most 100 minutes.

In embodiments of the present invention, a process for separation, as described herein, is disclosed wherein the blend is kept at said temperature for at least 10 minutes and at most 100 minutes.

The present invention also relates to a process for separation, as described herein, wherein the first mixture is added in one step to the raw material composition to provide the blend; or an amount of the first mixture is added in a first step to raw material composition to provide a blend, then further amount, or amounts, of the first mixture is added in a second step, or in a second step and in any further step or steps, to provide the blend.

Each of said "first step", "second step" and "any further step or steps", may in each step, independently, comprise batchwise, and/or continuous, addition/s of said first mixture.

In embodiments of the present invention, a process for separation, as described herein, is disclosed wherein the first mixture is added in one step to the raw material composition to provide the blend.

In further embodiments of the present invention, a process for separation, as described herein, is disclosed wherein an amount of the first mixture is added in a first step to raw material composition to provide a blend, then further amount, or amounts, of the first mixture is added in a second step, or in a second step and in any further step or steps, to provide the blend.

In an embodiment of the present invention, a process for separation, as described herein, is disclosed wherein an amount of the first mixture is added in a first step to raw material composition to provide a blend, then further amount of the first mixture is added in a second step to provide the blend.

The present invention also relates to a process for separation, as described herein, wherein the blend further comprises a second mixture comprising an alkaline solution containing hydroxide ions, lignin residues and other dissolved wood components, for example, being, e.g. industrial black liquor, for example, a black liquor being spent cooking liquor obtained from the kraft process, wherein the second mixture is either added to the first mixture, or added to the blend; or a first amount of the second mixture is added in a third step to blend, then further amount, or amounts, of the second mixture is/are added in a fourth step, or in any further step or steps.

Furthermore, the present invention also relates to a process for separation wherein the second mixture, as described herein, comprises an aqueous alkaline solution containing hydroxide ions, lignin residues and hemicellulose.

Each of said "third step", "fourth step" and "any further step or steps", may in each step, independently, comprise batchwise, and/or continuous, addition/s of said second mixture.

In an embodiment of the present invention, a process for separation, as described herein, is disclosed wherein the second mixture is either added to the first mixture, or added to the blend.

In a further embodiment of the present invention, a process for separation, as described herein, is disclosed wherein a first amount of the second mixture is added in a third step to blend, then further amounts of the second mixture are added in a fourth step and in any further step or steps.

In a further embodiment of the present invention, a process for separation, as described herein, is disclosed wherein a first amount of the second mixture is added in a third step to blend, then a further amount of the second mixture is added in a fourth step.

In embodiments of the present invention, a process for separation, as described herein, is disclosed wherein the first mixture is added in one step to the raw material composition to provide the blend; or, alternatively, an amount of the first mixture is added in a first step to raw material composition to provide a blend, then a further amount of the first mixture is added in a second step, and wherein the second mixture is either added to the first mixture, or added to the blend, in a step that is separate from the addition step, or steps, of the first mixture, or the second mixture is either added to the first mixture, or added to the blend, in a step that coincides with anyone of "the one step addition", "the first step addition" and "the second step addition" of the first mixture.

In a further embodiment of the present invention, a process for separation, as described herein, is disclosed wherein the first mixture comprises an alkaline solution, wherein the alkaline solution comprises NaOH, e.g. NaOH and NaHS, for example, NaOH, NaHS and $Na_2CO_3$, or e.g. an industrial white liquor.

In an embodiment of the present invention, a process for separation, as described herein, is disclosed wherein the first mixture comprises an alkaline solution, wherein the alkaline solution comprises NaOH.

In a further embodiment of the present invention, a process for separation, as described herein, is disclosed wherein the first mixture comprises an alkaline solution, wherein the alkaline solution comprises NaOH and NaHS.

In an even further embodiment of the present invention, a process for separation, as described herein, is disclosed wherein the first mixture comprises an alkaline solution, wherein the alkaline solution comprises NaOH, NaHS and $Na_2CO_3$.

In a further embodiment of the present invention, a process for separation, as described herein, is disclosed wherein the first mixture comprises an alkaline solution, wherein the alkaline solution comprises an industrial white liquor.

A further embodiment of the present invention, a process for separation, as described herein, is disclosed, wherein the second mixture is a black liquor, being a waste liquor obtained from delignification of lignocellulosic material.

An even further embodiment of the present invention, a process for separation, as described herein, is disclosed, wherein the second mixture is a black liquor being spent cooking liquor obtained from the kraft process, wherein the main dissolved components in this liquor is dissolved wood components and residual cooking chemicals. In the case where the present invention is implemented, the spent cooking liquor, i.e. black liquor, would also contain degradation products from "the polycotton material" liberated during the hydrolysis of polyester.

In a further embodiment of the present invention, a process for separation, as described herein, is disclosed, wherein the cellulose containing component or components, comprise cotton composition, and zero, one, two or more, of lignocellulosic composition, cellulose composition, regenerated cellulosic fibres composition, e.g. viscose composition, modal composition and/or lyocell composition, flax composition and cotton composition.

In still a further embodiment of the present invention, a process for separation, as described herein, is disclosed, wherein the polyester composition comprises a cellulose containing component comprising a cotton composition, and any further cellulose containing component, or components, of the raw material composition, each comprises one, or two, of lignocellulosic composition, cellulose composition, regenerated cellulosic fibres composition, e.g. viscose composition, modal composition and/or lyocell composition, flax composition and cotton composition.

The present invention also relates to embodiments of a process for separation, as described herein, wherein the process for separation further comprises a step, or steps, of physically separating, e.g. by filtering, the cellulosic part.

The present invention also relates to further embodiments of a process for separation, as described herein, wherein the process for separation also comprises any suitable further treatment comprising additional cleaning, and/or purification, process steps, e.g. comprising bleaching of recovered cellulosic part, and/or, for example, washing, screening and/or viscosity adjustments of recovered cellulosic part, and/or drying.

The present invention also relates to embodiments of a process for separation, as described herein, wherein the process for separation is integrated into an alkaline pulping process, such as the kraft process.

The process for separation of the present invention, as described herein, wherein the process for separation is integrated into an alkaline pulping process, such as the kraft process, has by said integration into an alkaline pulping process readily available hydrolyzing liquor.

The present invention further relates to embodiments of a process for separation, as described herein, wherein the process for separation is integrated into an alkaline pulping process, such as the kraft process, and therein into a production of kraft type dissolving pulp or paper pulp from lignocellulosic material.

Moreover, the present invention also relates to a cellulosic composition obtainable from a process for separation, in accordance with the present invention, as described herein, and/or a mixture comprising polyester hydrolysis products, which comprises ethylene glycol and terephthalic acid, wherein the mixture, comprising the polyester hydrolysis products, is obtainable from a process for separation, in accordance with the present invention, as described herein.

An embodiment of the present invention, relates to a cellulosic composition obtainable from a process for separation, in accordance with the present invention, as described herein.

A further embodiment of the present invention, the present invention relates to a mixture comprising polyester hydrolysis products, which comprises ethylene glycol and terephthalic acid, and wherein the mixture, comprising the polyester hydrolysis products, is obtainable from a process for separation, in accordance with the present invention, as described herein.

The present invention also relates to a pulp obtainable by a process for producing a pulp comprising the process for separation, in accordance with the present invention, as described herein, and/or a pulp, wherein the pulp comprises, and/or is obtainable from, the cellulosic composition, in accordance with the present invention, as described herein.

The pulp, in accordance with the present invention, may be a dissolving pulp. A dissolving pulp, also known as dissolving cellulose, is a bleached wood pulp that has a high cellulose content and is produced chemically from the wood by, conventionally, using the, herein described, sulfite process or the, also herein described, kraft process.

In the kraft process, wood is treated with an aqueous mixture of sodium hydroxide and sodium sulfide, which degrades and solubilizes lignin leading to a liberation of the wood fibers. Furthermore, conventional manufacturing of dissolving pulps is achieved by use of kraft processes, e.g. kraft processes comprising a prehydrolysis step which prehydrolysis step removes hemicelluloses.

The pulp, in accordance with the present invention, may be a paper pulp, wherein the paper pulp may be produced from lignocellulosics by, conventionally, using alkaline pulping processes, such as the kraft process.

Further, the present invention relates to a pulp, in accordance with the present invention, wherein the pulp is a dissolving pulp or a paper pulp.

A further embodiment of the present invention relates to a pulp obtainable by a process for producing a pulp comprising the process for separation, in accordance with the present invention, as described herein.

Still a further embodiment of the present invention relates to a pulp, wherein the pulp is obtainable from the cellulosic composition, in accordance with the present invention, as described herein.

The present invention also relates to a dissolving pulp obtainable by a process for producing a dissolving pulp comprising the process for separation, in accordance with the present invention, as described herein, and/or a dissolving pulp, wherein the dissolving pulp comprises, and/or is obtainable from, the cellulosic composition, in accordance with the present invention, as described herein.

A further embodiment of the present invention relates to a dissolving pulp obtainable by a process for producing a dissolving pulp comprising the process for separation, in accordance with the present invention, as described herein.

Still a further embodiment of the present invention relates to a dissolving pulp, wherein the dissolving pulp is obtainable from the cellulosic composition, in accordance with the present invention, as described herein.

The present invention further also relates to a paper pulp obtainable by a process for producing a paper pulp comprising the process for separation, in accordance with the present invention, as described herein, and/or a paper pulp, wherein the paper pulp comprises, and/or is obtainable from, the cellulosic composition, in accordance with the present invention, as described herein.

A further embodiment of the present invention relates to a paper pulp obtainable by a process for producing a paper pulp comprising the process for separation, in accordance with the present invention, as described herein.

Still a further embodiment of the present invention relates to a paper pulp, wherein the paper pulp is obtainable from the cellulosic composition, in accordance with the present invention, as described herein.

The present invention also relates to a regenerated cellulosic fibres product comprising regenerated cellulosic fibres composition, e.g. viscose composition, modal composition and/or lyocell composition, wherein the regenerated cellulosic fibres product comprises, or is producible from, a cellulosic composition, in accordance with the present invention, as described herein; or wherein the regenerated cellulosic fibres product comprises, or is producible from, a dissolving pulp, in accordance with the present invention, as described herein.

Further, embodiments of the present invention do also relate to a regenerated cellulosic fibres product comprising regenerated cellulosic fibres composition, e.g. viscose composition, modal composition and/or lyocell composition, wherein the regenerated cellulosic fibres product comprises a cellulosic composition, in accordance with the present invention, as described herein.

Embodiments of the present invention do further relate to a regenerated cellulosic fibres product comprising regenerated cellulosic fibres composition, e.g. viscose composition, modal composition and/or lyocell composition, wherein the regenerated cellulosic fibres product is producible from a cellulosic composition, in accordance with the present invention, as described herein.

Still further, embodiments of the present invention do relate to a regenerated cellulosic fibres product comprising regenerated cellulosic fibres composition, e.g. viscose composition, modal composition and/or lyocell composition, wherein the regenerated cellulosic fibres product comprises a dissolving pulp, in accordance with the present invention, as described herein.

Embodiments of the present invention do further also relate to a regenerated cellulosic fibres product comprising regenerated cellulosic fibres composition, e.g. viscose composition, modal composition and/or lyocell composition, wherein the regenerated cellulosic fibres product is producible from a dissolving pulp, in accordance with the present invention, as described herein.

The present invention further relates to a paper product, wherein the paper product comprises, or is producible from, a cellulosic composition, in accordance with the present invention, as described herein; or wherein the paper product comprises, or is producible from, a dissolving pulp, in accordance with the present invention, as described herein.

Further, embodiments of the present invention do also relate to a paper product, wherein the paper product comprises a cellulosic composition, in accordance with the present invention, as described herein.

Embodiments of the present invention do further relate to a paper product, wherein the paper product is producible from a cellulosic composition, in accordance with the present invention, as described herein.

Still further, embodiments of the present invention do relate to a paper product, wherein the paper product comprises a dissolving pulp, in accordance with the present invention, as described herein.

Embodiments of the present invention do further also relate to a paper product, wherein the paper product is producible from a dissolving pulp, in accordance with the present invention, as described herein.

Moreover, the present invention also discloses a process for hydrolyzing polyester, wherein the polyester is hydrolyzed in a process wherein the process
providing a blend, wherein the blend comprises a raw material composition and a hydrolyzing liquor,
wherein the raw material composition comprises a polyester composition,
wherein the polyester composition comprises polyester and raw material component or components, e.g. cellulose containing component or components,
wherein the hydrolyzing liquor comprises a first mixture comprising an alkaline solution containing hydroxide ions,
the hydrolyzing liquor is added to give the blend an effective alkali concentration in a range from 5 g/l to 150 g/l, wherein the effective alkali concentration is calculated as NaOH, and
the hydrolyzing liquor:raw material composition ratio from 1.5:1 up to 25:1, i.e. from 1.5 $dm^3$/kg up to 25 $dm^3$/kg, and
keeping the blend at a temperature of 100° C. or above, e.g. 110° C. or above, for example, 115° C. or above, e.g. 120° C. or above, for example, 125° C. or above, e.g. 130° C. or above, for example, 135° C. or above, or, e.g. 140° C. or above.

The present invention also discloses a process for hydrolyzing polyester, wherein the polyester is hydrolyzed in a process wherein the process
providing a blend, wherein the blend comprises a raw material composition and a hydrolyzing liquor,
wherein the raw material composition comprises a polyester composition,
wherein the polyester composition comprises 99%, or less, by weight of polyester and 1%, or more, by weight of raw material component or components, e.g. cellulose containing component or components,
wherein the hydrolyzing liquor comprises a first mixture comprising an alkaline solution containing hydroxide ions,
the hydrolyzing liquor is added to give the blend an effective alkali concentration in a range from 5 g/l to 150 g/l, wherein the effective alkali concentration is calculated as NaOH, and
the hydrolyzing liquor:raw material composition ratio from 1.5:1 up to 25:1, i.e. from 1.5 $dm^3$/kg up to 25 $dm^3$/kg, and
keeping the blend at a temperature of 100° C. or above, e.g. 110° C. or above, for example, 115° C. or above, e.g. 120° C. or above, for example, 125° C. or above, e.g. 130° C. or above, for example, 135° C. or above, or, e.g. 140° C. or above.

All the description, features, embodiments and fallbacks, as described herein for "the process for separation of the cellulosic part from a raw material composition comprising polyester and cellulose containing composition", in accordance with the present invention, do also apply to said "process for hydrolyzing polyester". Accordingly, the naming and denoting of most features of the "process for hydrolyzing polyester" are same as of "the process for separation of the cellulosic part from a raw material composition comprising polyester and cellulose containing composition". Thus, all the description, features, embodiments and fallbacks, as described herein for "the process for separation of the cellulosic part from a raw material composition comprising polyester and cellulose containing composition" do also apply mutatis mutandis to said "process for hydrolyzing polyester" and the corresponding description, features, embodiments and fallbacks are hence included in, and for, said "process for hydrolyzing polyester".

The raw material component or components of the "process for hydrolyzing polyester" may, in accordance with the present invention, comprise other raw material component or components than cellulose containing component or components.

BRIEF DESCRIPTION OF DRAWINGS

Aspects of the invention will be described in greater detail in the following, with reference to the embodiments that are shown in the drawings, in which FIG. 1 schematically shows "a process for separation of the cellulosic part from a raw material composition", in accordance with the present invention and as described herein.

DETAILED DESCRIPTION

The embodiments of the present invention as described in the following are to be regarded only as examples and are in no way intended to limit the scope of the present invention.

Figure 1:
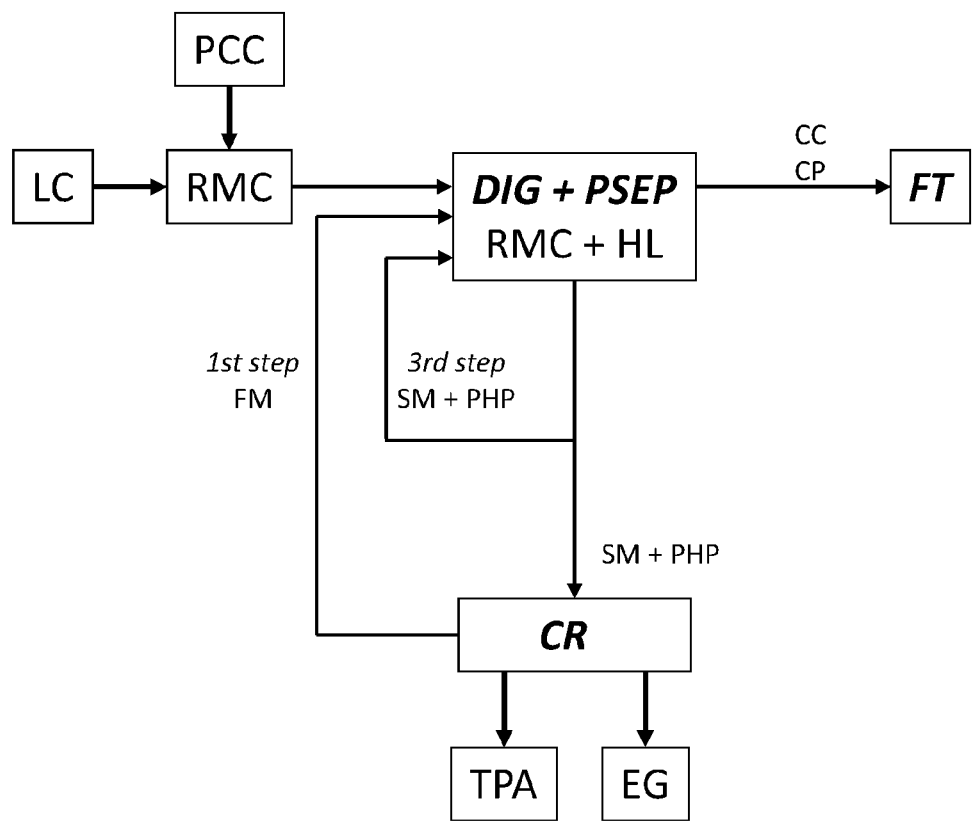

FIG. 1 schematically shows "a process for separation of the cellulosic part from a raw material composition", in accordance with the present invention and as described herein. Here FIG. 1 may schematically represent a "process for separation of the cellulosic part from a raw material composition" that is integrated into an alkaline pulping process, such as the kraft process. In an alkaline pulping process, such as the kraft process, dissolving pulp, or paper pulp, is produced from lignocellulosic material.

Here the "raw material composition", RMC, which comprises "polycotton composition", PCC, i.e. "polyester and cellulose containing component", and a "lignocellulosic composition", LC, i.e. one "further cellulose containing component", and a "hydrolyzing liquor", HL, are provided into a vessel, here a digester, DIG. Thereby, is a "blend" formed and hydrolysis of polyester will be performed in the digester, DIG. By said hydrolysis of polyester, is the cellulosic part, CP, recovered in the "raw material composition", RMC.

The "hydrolyzing liquor", HL, comprises here a "first mixture", FM, (here industrial white liquor), and a "second mixture", SM, (here industrial black liquor) and after hydrolysis of polyester also polyester hydrolysis products, PHP. After hydrolysis of polyester a part of a mix of "the polyester hydrolysis products", PHP, and the "second mixture", SM, goes to a "chemical recovery", CR, and the other part of the mix of "the polyester hydrolysis products", PHP, and the "second mixture", SM, goes (is recycled back) to the digester, DIG.

The "first mixture", FM, is added to the digester, DIG, in a "first step" (1 st step). Said "first step" (1 st step) may comprise batchwise, and/or continuous, addition/s of said "first mixture", FM, to the digester, DIG. When the "process for separation of the cellulosic part from a raw material composition" is integrated into an alkaline pulping process, such as the kraft process, said "first step" (1 st step) comprises batchwise, and/or continuous, addition/s of said "first mixture", FM, to the digester, DIG, wherein said "first mixture", FM, is chemically recovered in the "chemical recovery", CR, from a part of a mix of the "polyester hydrolysis products", PHP, and the "second mixture", SM.

In the chemical recovery, CR, there may also be included several process steps to isolate ethylene glycol, EG, and terephthalic acid, TPA.

The second mixture, SM, is added to the digester, DIG, in a "third step" (3rd step). Said "third step" (3rd step) may comprise batchwise, and/or continuous, addition/s of said second mixture, SM, to the digester, DIG.

When the "process for separation of the cellulosic part from a raw material composition" is integrated into an alkaline pulping process, such as the kraft process, said "third step" (3rd step) comprises batchwise, and/or continuous, addition/s of a part of the second mixture, SM, together with a part of the polyester hydrolysis products, PHP, to the digester, DIG.

The second mixture, SM, and the polyester hydrolysis products, PHP, are comprised in "products in solution" from the digester, DIG, and thus, another part of the mix of "the second mixture, SM, and the polyester hydrolysis products, PHP" is added, and recycled back, to the digester, DIG, in said "third step" (3rd step).

The "hydrolyzing liquor", HL, will then comprise a "first mixture", FM, (here industrial white liquor), a "second mixture", SM, (here industrial black liquor) and polyester hydrolysis products, PHP.

In a "physically separating" step, PSEP, here comprising e.g. filtering, and optionally screening and washing, the solid cellulosic part, CP, as a cellulosic composition, CC, comprising the cellulosic part, CP, is recovered.

The cellulosic part, CP as a cellulosic composition, CC, comprising the cellulosic part, CP may then be subjected to "further treatment", FT, which may comprise additional cleaning, and/or purification, process steps, e.g. comprising bleaching of recovered cellulosic part, and/or, for example, washing, screening and/or viscosity adjustments of recovered cellulosic part, and/or drying.

Figure 2:
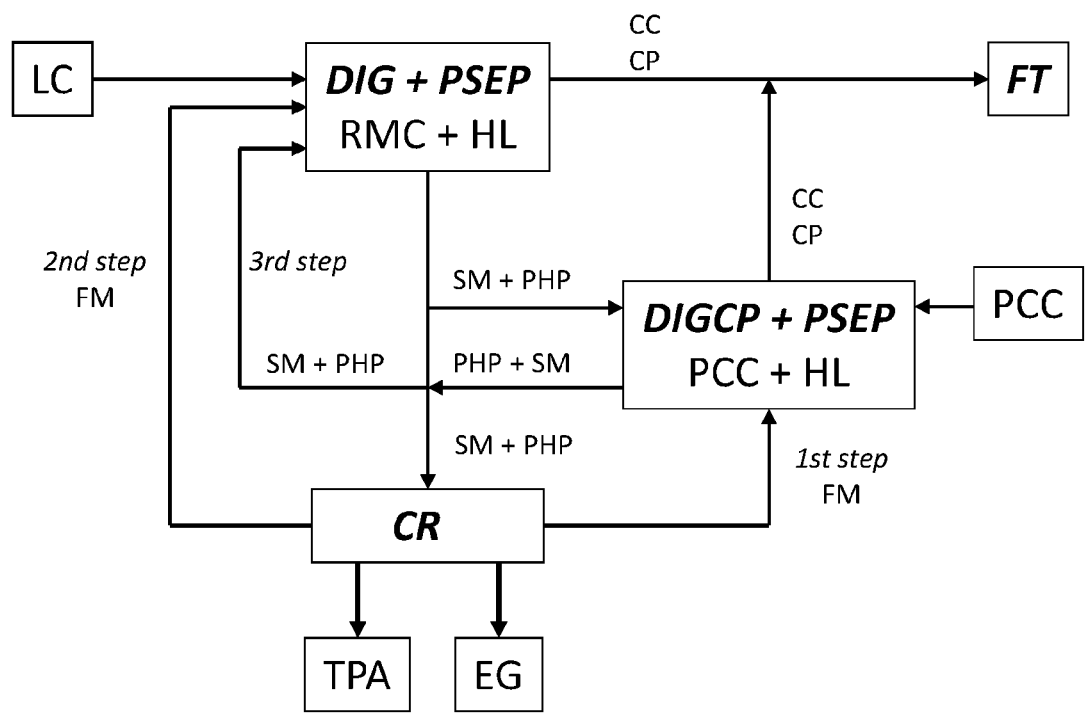
FIG. 2 schematically shows "a process for separation of the cellulosic part from a raw material composition", in accordance with the present invention and as described herein.

FIG. 2 schematically shows "a process for separation of the cellulosic part from a raw material composition", in accordance with the present invention and as described herein. Here FIG. 2 may schematically also represent a "process for separation of the cellulosic part from a raw material composition" that is integrated into an alkaline pulping process, such as the kraft process. In an alkaline pulping process, such as the kraft process, dissolving pulp, or paper pulp, is produced from lignocellulosic material.

Here a "polycotton composition", PCC, i.e. "polyester and cellulose containing component", is provided to a "separate digester for polycotton composition", DIGCP.

The "polycotton composition", PCC, i.e. "polyester and cellulose containing component", and "hydrolyzing liquor", HL are provided to the "separate digester for polycotton composition", DIGCP. A "blend" is formed and hydrolysis of polyester will be performed in the "separate digester for polycotton composition", DIGCP. By said hydrolysis of polyester, is the cellulosic part, CP, recovered in the "polycotton composition", PCC.

A "first mixture", FM, (here industrial white liquor) is added in a "first step" (1 st step) to the "separate digester for polycotton composition", DIGCP, wherein the "first step" (1 st step) may comprise batchwise, and/or continuous, addition/s of said "first mixture", FM, to the "separate digester for polycotton composition", DIGCP.

When the "process for separation of the cellulosic part from a raw material composition" is integrated into an alkaline pulping process, such as the kraft process, said "first step" (1 st step) comprises batchwise, and/or continuous, addition/s of said "first mixture", FM, to the "separate digester for polycotton composition", DIGCP, wherein said "first mixture", FM, is chemically recovered in a "chemical recovery", CR, from a part of a mix of "polyester hydrolysis products", PHP, and a "second mixture", SM from a further digester, DIG and from the "separate digester for polycotton composition", DIGCP. Note that "polycotton composition", PCC would be present in the mix from the further digester, DIG, and from the "separate digester for polycotton composition", DIGCP, only if not all polyester is hydrolyzed.

The second mixture, SM, is added to the "separate digester for polycotton composition", DIGCP, in a "fourth step" (reference "4th step" is not shown in FIG. 2). Said "fourth step" may comprise batchwise, and/or continuous, addition/s of said second mixture, SM, to the "separate digester for polycotton composition", DIGCP.

When the "process for separation of the cellulosic part from a raw material composition" is integrated into an alkaline pulping process, such as the kraft process, said "fourth step" comprises batchwise, and/or continuous, addition/s of said second mixture, SM, to the "separate digester for polycotton composition", DIGCP, wherein the second mixture, SM, is added as a part of a mix of "polyester hydrolysis products", PHP, and a "second mixture", SM from a digester, DIG.

Into the further digester, DIG, a "lignocellulosic composition", LC, i.e. one of "further cellulose containing component" is provided.

Part of the "first mixture", FM, is added to the digester, DIG, in a "second step" (2nd step). Said "second step" (2nd step) may comprise batchwise, and/or continuous, addition/s of said "first mixture", FM, to the digester, DIG. When the "process for separation of the cellulosic part from a raw material composition" is integrated into an alkaline pulping process, such as the kraft process, said "second step" (2nd step) comprises batchwise, and/or continuous, addition/s of said "first mixture", FM, to the digester, DIG, wherein said "first mixture", FM, is chemically recovered in the "chemical recovery", CR, from a part of a mix of the "polyester hydrolysis products", PHP, and the "second mixture", SM.

Part of a second mixture, SM, is added to the digester, DIG, in a "third step" (3rd step). Said "third step" (3rd step) may comprise batchwise, and/or continuous, addition/s of said second mixture, SM, to the digester, DIG.

When the "process for separation of the cellulosic part from a raw material composition" is integrated into an alkaline pulping process, such as the kraft process, said "third step" (3rd step) comprises batchwise, and/or continuous, addition/s of a part of mix of second mixture, SM, together with polyester hydrolysis products, PHP, to the digester, DIG.

The part of mix of second mixture, SM, together with polyester hydrolysis products, PHP are comprised in "products in solution" from DIG (recycled back) and in "products in solution" from DIGCP.

Further a part of the "first mixture", FM, is added to the digester, DIG, in a "second step" (2nd step). Said "second step" (2nd step) may comprise batchwise, and/or continuous, addition/s of said "first mixture", FM, to the digester, DIG. When the "process for separation of the cellulosic part from a raw material composition" is integrated into an alkaline pulping process, such as the kraft process, said "second step" (2nd step) comprises batchwise, and/or continuous, addition/s of said "first mixture", FM, to the digester, DIG.

The part of the "first mixture", FM, is chemically recovered in the "chemical recovery", CR, from a part of a mix of the "polyester hydrolysis products", PHP, and the "second mixture", SM, from DIG and DIGCP.

By the additions here above in said "second step" (2nd step) and said "third step" (3rd step) a blend comprising a "hydrolyzing liquor", HL, is formed. The blend comprises here in DIG a "hydrolyzing liquor", HL, comprising here a "first mixture", FM, (here industrial white liquor), and a "second mixture", SM, (here industrial black liquor), polyester hydrolysis products, PHP, and "polycotton composition" if not all polyester is hydrolyzed. After hydrolysis of polyester parts of mix of "the polyester hydrolysis products", PHP, and the "second mixture", SM from DIG go to the "third step" (recycled back to DIG), to the "fourth step" (DIGCP) and to a "chemical recovery", CR.

In the chemical recovery, CR, there may also be included several process steps to isolate ethylene glycol, EG, and terephthalic acid, TPA.

In a "physically separating" step, PSEP, here comprising e.g. filtering, and optionally screening and washing, the cellulosic part, CP, as a cellulosic composition, CC, comprising the cellulosic part, CP, is recovered.

The solid cellulosic part, CP as a cellulosic composition, CC, comprising the cellulosic part, CP, from the digester, DIG and the "separate digester for polycotton composition", DIGCP, may then be subjected to "further treatment", FT, which may comprise additional cleaning, and/or purification, process steps, e.g. comprising bleaching of recovered cellulosic part, and/or, for example, washing, screening and/or viscosity adjustments of recovered cellulosic part, and/or drying.

EXPERIMENTALS

Comparative Examples

In Palme et al. "*Textiles and Clothing Sustainability*" (2017) 3:4 is, as already mentioned herein, a process for separation of cotton and polyester (in their case polyethylene terephthalate, PET) from mixed textiles is described. In the process for separation in Palme et al., 5 to 15% by weight NaOH in water and a temperature in the range of between 70 and 90° C. were used for the hydrolysis of polyester. Addition of a phase transfer catalyst, in their case benzyl-tributylammonium chloride (BTBAC), was shown to shorten the time for the hydrolysis of polyester. However, Palme et al. also showed that the separation can be performed without the phase transfer catalyst, but this required longer treatment times resulting in more cotton degradation.

It is beneficial if the hydrolysis is carried out without any catalyst: One reason is the cost of the catalyst and another is that the types of phase transfer catalysts suggested for hydrolysis of polyester will make the handling of the spent liquor after hydrolysis more complicated, since one more component is added. For example, the type of phase transfer catalyst used in Palme et al., BTCAC, contains organically bound nitrogen, which will contribute to the emissions of $NO_x$ if incinerated in a recovery boiler, cf. e.g. Adams, editor (1997) "Kraft recovery boilers" pp. 226-229.

In Palme et al., the time dependence of hydrolysis at 70, 80, and 90° C. and 10% NaOH (reagent grade) with BTBAC present is compared to hydrolysis at 90° C. and 10% NaOH without any addition of BTBAC. In the trials, 5 g textile was added to 500 g of the treatment solution. Hydrolysis without BTBAC was much slower than with this additive. Nevertheless, after approximately 150 min, the PET had been completely degraded. A look at the charge of alkali, however, reveals that the amount of costly sodium hydroxide used in the treatment is 1000% NaOH on dry textile. Consequently, there is a need for new disclosures to create an industrially sound process for the separation of cellulose from a polyester composition.

Example 1, Trials No. 1-3

Discarded polycotton sheets (i.e. "a raw material composition" in accordance with the present invention and "a polyester composition" in accordance with the present invention) from a supplier of service textiles where cut in pieces, with the size of approximately 1 cm×1 cm, using a pair of scissors. Small portions of the pieces (ca. 5 g each) were subjected to milling in a Wiley mill and then analyzed for polyester content according to SS-EN ISO 1833-11: 2017. The sheets were composed of a mixture of polyethylene terephthalate (PET) and cotton, and the part that not was hydrolyzed is denoted polyester. The analyzed content of polyester in the samples varied from 55.0 to 56.4% by weight, see Table 1.

TABLE 1

Analysis of the polyester content in the sheets

| Sample | Polyester content (% by weight) |
|---|---|
| 1 | 56.2 |
| 2 | 55.0 |
| 3 | 56.4 |
| 4 | 56.3 |

Pieces of the cut sheets were treated in autoclaves with alkaline solutions (i.e. "a hydrolyzing liquor" in accordance with the present invention and "a first mixture" in accordance with the present invention) in order to investigate the extent of polyester removal during different treatments. 50 g, oven-dry weight, of polycotton sheet pieces (i.e. "a raw material composition" in accordance with the present invention and "a polyester composition" in accordance with the present invention) was put in the autoclaves together with the alkaline solution (i.e. "a hydrolyzing liquor" in accordance with the present invention) and the liquor to sheet ratio was adjusted to 6 dm$^3$/kg. The autoclaves were closed and put in a hot air oven in which they were rotated. During the treatment in the hot air oven, the temperature in the autoclaves was measured. The temperature, which at the start was 25° C., was increased in a controlled way to a selected maximum temperature for the treatment. The temperature was raised from 25° C. to 70° C. over a period of 30 minutes at a constant rate. The temperature was stabilized at 70° C. for 15 minutes before further temperature increase. After stabilization, the treatment temperature was again increased using a temperature increase of 0.75° C./min up to desired cooking temperature. The cooking was then maintained until the desired time at cooking temperature had been reached. After the cooking, the autoclaves were rapidly cooled down to 20° C. using cool water. After the cook, the solid residue was carefully washed with deionized water and then the percentage of polyester in the solid residue was determined.

The alkaline solutions (i.e. "a hydrolyzing liquor" in accordance with the present invention) used were prepared from NaOH of analytical grade (i.e. "a first mixture" in accordance with the present invention) or with industrial white liquor with a concentration of effective alkali (EA) of 127 g/l (calculated as NaOH) and a sulfidity (S) of 36% (i.e. "a first mixture" in accordance with the present invention), which corresponds to [OH$^-$]=3.175 mol/l and [SH$^-$]=0.7 mol/l. Furthermore, trials were conducted where the treatment solution contained a mixture of the industrial white liquor (i.e. "a first mixture" in accordance with the present invention) and industrial black liquor (i.e. "a second mixture" in accordance with the present invention). Black liquor is spent cooking liquor obtained from the kraft process and the main dissolved components in this liquor are dissolved wood components and residual cooking chemicals. The residual effective alkali concentration in the black liquor used was 6 g/l. When black liquor was added, the sum of EA in white liquor and in the black liquor was considered as the alkali charge (% EA on dry sheets).

TABLE 2

Results from the cooking in Trials No. 1-3

| Trial No. | Alkaline solution | Alkali charge (% EA on dry sheets) | Cooking temperature (° C.) | Time at cooking temperature (min.) | Polyester content in solid residue (% by weight) |
|---|---|---|---|---|---|
| 1 | NaOH | 28 | 140 | 20 | 15.2 |
| 2 | White liquor | 28 | 140 | 20 | 8.1 |
| 3 | White liquor + black liquor | 28 | 140 | 20 | 0.79 |

The results from Trials No. 1-3 in Table 2 illustrate the effect of alkali solution (i.e. "a hydrolyzing liquor" in accordance with the present invention) used on the polyester content in the solid residue (i.e. "the cellulosic part" in accordance with the present invention) after cooking. In Trial No. 1, in which NaOH was used, the percentage of polyester in the solid residue (i.e. "the cellulosic part" in accordance with the present invention) was 15.2% and in Trial No. 2 where industrial white liquor (i.e. "a first mixture" in accordance with the present invention) was used as the alkali source (i.e. "a hydrolyzing liquor" in accordance with the present invention), the percentage of polyester remaining in the solid residue (i.e. "the cellulosic part" in accordance with the present invention) was 8.1%. The results related to Trial No. 3 show that the combination (i.e. "a hydrolyzing liquor" in accordance with the present invention) of industrial white liquor (i.e. "a first mixture" in accordance with the present invention) and black liquor (i.e. "a second mixture" in accordance with the present invention) resulted in a cook where only 0.79% polyester remained in the solid residue (i.e. "the cellulosic part" in accordance with the present invention). These results show that it is not only the alkalinity of the treatment solution, in combination with treatment time and temperature, that governs the extent of polyester removal from polyester containing textiles, but surprisingly also the type of alkaline liquor is of decisive importance.

It is, however, important to note that the amount of alkali that is charged must exceed the alkali consumption due to the amount of alkali required for the neutralization of acids liberated during the hydrolysis of the ester bonds in the polyester. Otherwise, the alkali promoted hydrolysis of the ester bonds will stop when the alkali is consumed.

Furthermore, inspection of the solid residues (i.e. "the cellulosic part" in accordance with the present invention)

from Trial No. 3 using a light microscope showed that the only fibers detected were cotton fibres.

In the present Example 1, a liquor to sheet ratio applied was 6 dm³/kg. However, a satisfactory result may be obtained at other ratios as well, but in an industrial application it is beneficial to minimize the water usage and the amount of added alkali. If the ratio is increased, more process solution will be needed and more alkali in the hydrolyzing liquor is needed to reach a sufficient alkali concentration in the hydrolyzing liquor. If the alkali concentration in the hydrolyzing mixture is decreased, reaction temperature and/or reaction time must be increased. The limits regarding the preferred hydrolyzing liquor:raw material composition ratio is also dependent on whether the hydrolysis if the polyester is carried out in a step also containing e.g. wood chips (i.e. "further cellulose containing component" in accordance with the present invention), see Examples 2 and 3 where the conditions during the polyester hydrolysis, to a large extent, are adjusted to meet the requirements for the removal of non-cellulosic constituents from the wood material. Regarding temperature and alkali concentration, there is a balance between cellulose degradation and hydrolysis of polyester. The cleavage of cellulose chains in alkaline solutions becomes significant at temperatures of about 170° C., since at this temperature alkaline hydrolysis of polysaccharides becomes important (Fengel and Wegener (1989) "Wood. Chemistry, ultrastructure, reactions" Walter de Gruyter, Berlin, pp 299-300). Of course, one could go somewhat higher in temperature, if the decrease in reaction time will justify the higher degree of cellulose degradation, but in practice, a maximum temperature should be limited to 180° C.

Example 2

In order to produce material for an investigation of how of the solid residue (cotton fibres) (i.e. "the cellulosic part" in accordance with the present invention and "the cellulosic composition obtained from the process of separation" in accordance with the present invention) performs in a bleach sequence after hydrolysis of the polyester part of the sheets, pieces of the sheets (i.e. "a raw material composition" in accordance with the present invention and "a polyester composition" in accordance with the present invention) were subjected to cooking with a combination (i.e. "a hydrolyzing liquor" in accordance with the present invention) of industrial white liquor (i.e. "a first mixture" in accordance with the present invention) and black liquor (i.e. "a second mixture" in accordance with the present invention). Four autoclaves were charged with 100 g (dry weight) of sheet pieces (i.e. "a raw material composition" in accordance with the present invention and "a polyester composition" in accordance with the present invention) each, and the cooking procedure was the same as in Example 1. Alkali charge, cooking temperature and time at cooking temperature are shown in Table 3 along with the cooking results. In this trial, also the limiting viscosity of the treated material was determined.

TABLE 3

Results from the cooking in Trial No. 4

| Trial No. | Alkaline solution | Alkali charge (% EA on dry sheets) | Cooking temperature (° C.) | Time at cooking temperature (min.) | Viscosity (dm³/kg)) | Polyester content in solid residue (%) |
|---|---|---|---|---|---|---|
| 4 | White liquor + black liquor | 30 | 140 | 60 | 743 | 0.29 |

Prior the actual bleaching, the cotton material (i.e. "the cellulosic part" in accordance with the present invention and "the cellulosic composition obtained from the process of separation" in accordance with the present invention) obtained after the cooking was mechanically treated in order to liberate the cotton fibres from threads and the fabric-like structure of the treated sheets that partly remained. The mechanical treatment was carried out using two different devices: An apparatus designed for the laboratory-wet disintegration of chemical pulps, designed according to ISO 5263, and a PFI mill designed for the laboratory beating of pulp, the PFI mill and the procedure is described in ISO 5264. In the procedure for the liberation of cotton fibres applied, the cotton material was first treated in the apparatus for wet-disintegration where 15 g (dry weight) cotton material suspended in 2 litres of deionized water was treated each time. The extent of the treatment is given by the number of revolutions of the propeller in the apparatus, and in this case, the number of revolutions was 90 000. After this, the material, 30 g each time, was subjected to beating in the PFI-mill using 3000 revolutions. After the beating, the cotton material (i.e. "the cellulosic part" in accordance with the present invention and "the cellulosic composition obtainable from the process of separation" in accordance with the present invention) was subjected to wet-disintegration again (15 g, dry weight, in 2 litres deionized water each time), but this time using 30 000 revolutions. In total 120 g (dry-weight) defibrated cotton material was produced. In the following description of the bleaching, this material is denoted pulp (i.e. "pulp obtainable by a process for producing a pulp" in accordance with the present invention and "pulp obtainable from the cellulosic composition" in accordance with the present invention).

The pulp was bleached using a D/A-EP-D/Q-PO sequence. Between each bleaching step the pulp was washed with deionized water.

The D/A step (acidic step in combination with chlorine dioxide) was performed at 90° C. and a pulp consistency of 10% for 150 minutes in plastic bags. The $ClO_2$ charge was 1.9 kg/ton dry pulp (5 kg/t as active chlorine) and 9 kg $H_2SO_4$/ton dry pulp was added.

The EP-step (alkaline extraction fortified with hydrogen peroxide) was performed in plastic bags at 80° C. and a pulp consistency of 10% for 70 minutes. The $H_2O_2$ and NaOH charges were 2 and 3 kg/ton dry pulp, respectively.

The D/Q-step (chlorine dioxide bleaching step with a subsequent EDTA treatment without washing in between) was performed in plastic bags at 80° C. and a pulp consistency of 10% for 120 minutes in the D-step. The $ClO_2$ charge was 1.5 kg/ton dry pulp (4 kg/ton dry pulp as active chlorine). At the end of the D-step, EDTA (0.5 kg/ton dry pulp) and NaOH (0.5 kg/ton dry pulp) were charged to the pulp and allowed to react for 5 minutes before washing of the pulp.

The last bleaching step (the PO-step, pressurized peroxide bleaching) was performed at 85° C. and 10% pulp consistency for 120 minutes in autoclaves. NaOH and $MgSO_4$ charges were 8 and 1 kg/ton dry pulp, respectively, while the $H_2O_2$ charge was 3 kg/ton dry pulp.

After the bleaching, the pulp (i.e. "pulp obtainable by a process for producing a pulp" in accordance with the present invention and "pulp obtainable from the cellulosic composition" in accordance with the present invention) was analyzed, and the results are summed up in Table 4 together with examples from literature showing experimental values for three commercial dissolving pulps analyzed at our lab. The results demonstrate that the pulp obtained from the discarded sheets has properties that indicate that it would perform very well as a dissolving pulp (i.e. "dissolving pulp obtainable by a process for producing a pulp" in accordance with the present invention and "dissolving pulp obtainable from the cellulosic composition" in accordance with the present invention) for viscose production. Especially the high alkali resistance (low solubility in 18 and 10 wt % NaOH solutions, R-18 and R-10, respectively) is highly valued by viscose producers, since a high alkali resistance indicates that there will be a high cellulose yield in the viscose production. It may also be noted that when the bleached pulp from Trial No. 4 was analyzed for Klason lignin content, no Klason lignin was detected. If polyester had been present in the bleached pulp, it would have been contributing to the analyzed value, since the procedure for Klason lignin includes acid hydrolysis of carbohydrates leading to a total solubilization of the carbohydrates, leaving possible traces of polyester in the solid phase (in the Klason lignin determination of different lignocellulosic materials, the solid residue is considered to reflect the lignin content in the sample).

large degree of fiber cutting. Therefore, when the pieces of sheets were milled, a powder-like material consisting of shortened textile fibres were obtained.

Prior to the prehydrolysis step, air-dried wood chips were impregnated with water over-night. Thereafter, the impregnated wood chips (i.e. "further cellulose containing component" in accordance with the present invention) together with the milled sheets (i.e. "a polyester composition" in accordance with the present invention) were put in in the autoclaves (the same cooking equipment as in Examples 1 and 2 was used) and the water to solid material ratio was adjusted to 1.5 $dm^3$ water/kg solid material by addition of deionized water to the autoclaves. The total weight of wood chips and sheet material was 300 g dry weight (i.e. "raw material composition" in accordance with the present invention) in each autoclave.

In the prehydrolysis step, a lab procedure where a good control over the P-factor is achieved was used. The temperature was increased from 25° C. to 70° C. over a period of 30 minutes at a constant rate. The temperature was stabilized at 70° C. for 10 minutes before further temperature increase. After stabilization, the treatment temperature was again increased using a temperature increase of 1.8° C./min up to 170° C. Then, the temperature was kept constant until the desired P-factor was reached.

After the prehydrolysis step, the autoclaves were rapidly cooled down to 45° C. using cool water before white liquor (i.e. "a hydrolyzing liquor" in accordance with the present invention and "a first mixture" in accordance with the present invention) was charged to the autoclaves and the liquor to wood+sheet material ratio was adjusted to 4:1 using water. The charge of effective alkali was calculated as g EA/(g dry wood chips+dry sheet material). In the reference cooking, without any addition of sheet material, the charge

TABLE 4

Results from analyses of the pulp obtained after bleaching of the pulp originating from Trial No. 4 and from three different commercial dissolving pulps

| Pulp | Brightness (% ISO) | Viscosity ($dm^3$/kg) | Klason lignin (%) | Relative carbohydrate composition (%) | | | Alkali resistance (%) | |
|---|---|---|---|---|---|---|---|---|
| | | | | Glucan | Xylan | Mannan | R-18 | R-10 |
| Bleached pulp from Trial No. 4 | 91.9 | 373 | 0.0 | 99.6 | 0.3 | <0.1 | 98.5 | 95.1 |
| Pulp A Hardwood Kraft | 90.9 | 402 | 0.0 | 95.4 | 4 | 0.2 | 96.2 | 91.8 |
| Pulp B Hardwood Kraft | 93.7 | 376 | 0.0 | 95.5 | 3.7 | 0.5 | 96.7 | 92.9 |
| Pulp C Hardwood Sulfite | 93.7 | 490 | 0.3 | 96.8 | 2.3 | 0.2 | 93.6 | 89.7 |

Example 3

Three different prehydrolysis kraft pulps (PHK pulps) were produced in the laboratory from *Eucalyptus* chips (*Eucalyptus globulus*) with varying amounts of discarded sheets added to the wood chips. For details about PHK pulp, P- and H-factors it is here referred to WO2018115290. In this example, the sheets (of the same origin as in Example 1) (i.e. "a polyester composition" in accordance with the present invention) were first cut in pieces and then subjected to milling in a Wiley mill. This type of milling induces a of EA was 21%, and in the autoclaves containing 10% and 20% sheet material, the charge of effective alkali was 22% and 23%, respectively. The reason for the increased EA charge when sheet material was added was that pre-trials showed that the alkaline consumption during the treatment leading to hydrolysis of the polyester in the sheet material consumes more alkali than the reactions of the wood material during cooking do during pulping.

In the cooking-step the temperature was increased to a cooking temperature of 160° C., and the H-factor was recorded with high accuracy using a similar procedure as for the hydrothermal step. Initially temperature was set to 45° C. at 5 minutes. Thereafter, the temperature was raised to 70° C. in 15 minutes. After 15 minutes at 70° C., the temperature was increased with 0.75° C./min to cooking temperature, 160° C. The temperature was then maintained 160° C. until a H-factor of 400 was reached. The cook was terminated by rapid cooling of the autoclaves with cool water down to 20° C. After the cook, the kappa number, viscosity, carbohydrate composition and alkali resistance were determined, see Table 5.

TABLE 5

Results from PHK cooks using eucalyptus wood chips

| Trial No. | Sheet material in the cook (%) | Kappa number | Viscosity (dm³/kg) | Relative carbohydrate composition (%) | | |
|---|---|---|---|---|---|---|
| | | | | Glucan | Xylan | Mannan |
| 5 | 0 | 9.5 | 1072 | 97.50 | 2.34 | 0.16 |
| 6 | 10 | 7.2 | 1032 | 97.68 | 2.17 | 0.15 |
| 7 | 20 | 7.3 | 955 | 97.79 | 2.05 | 0.16 |

The results in Table 5 show that addition of the milled sheet material to the wood chips resulted in a pulp (i.e. "pulp obtainable by a process for producing a pulp" in accordance with the present invention and "pulp obtainable from the cellulosic composition" in accordance with the present invention) with a higher cellulose content than when eucalyptus wood chips only were used as the raw material. This is a natural consequence of the addition of sheet material to the pulping, since the sheets are virtually free from xylan. A high cellulose content of the pulp is a positive characteristic for dissolving pulp, since this type of pulp is used for the production of regenerated cellulose fibres, which principally should be made up by pure cellulose. Accordingly, these results imply that this new procedure for separating cellulose from discarded textiles containing cellulosic material can be implemented in existing production facilities for the production of dissolving pulp (i.e. "dissolving pulp obtainable by a process for producing a pulp" in accordance with the present invention and "dissolving pulp obtainable from the cellulosic composition" in accordance with the present invention).

Example 4

In a series of trials, the possibilities of implementing the new process in production of pulp intended for papermaking were investigated. To study one aspect of this embodiment of the invention, sheet material was added to cooks where Scandinavian softwood chips, a mixture of Norway spruce (*Picea abies*) and Scots pine (*Pinus silvestris*), were pulped. The properties of the resulting pulp (i.e. "pulp obtainable by a process for producing a pulp" in accordance with the present invention and "pulp obtainable from the cellulosic composition" in accordance with the present invention) were then analysed using standard methods for pulp characterization.

In the case of papermaking pulps, the morphological fiber characteristics are of vital importance for the performance of the pulp in papermaking and the properties of the produced paper. The trials in Examples 1-3 show that the separation of cellulose from sheets containing polyester and cellulose can be performed using milled sheets (Examples 2-3) or using sheets were the structure of the fabric to a large extent is intact (Example 1). This example, i.e. Example 4, compares the effects of two different pretreatments aiming for disintegration of the sheets prior to pulping: Milling in a Wiley mill leading to a large degree of fiber cutting and milling in a hammer mill, in which the fiber cutting is not that severe.

Prior to the cooking step, air-dried wood chips were impregnated with water over-night. Thereafter, the impregnated wood chips together with the milled sheets were put in in the autoclaves (the same cooking equipment as in Examples 1-3 was used). Thereafter, white liquor (i.e. "a hydrolyzing liquor" in accordance with the present invention and "a first mixture" in accordance with the present invention) was charged to the autoclaves and the liquor to wood+sheet material ratio was adjusted to 4:1 using water. The charges of effective alkali and percentage of sheet material added are shown in Table 6. The temperature was raised from 25 to 70° C. in 15 minutes. After 15 minutes at 70° C., the temperature was increased to 167° C. in 120 minutes. The temperature was then maintained 167° C. until a H-factor of 1200 was reached. After the cook, residual alkali was determined, and after washing the resulting pulps were characterized, see Tables 6 and 7. Furthermore, handsheets prepared from the pulps were analyzed, see Table 8.

TABLE 6

Data from the cooks (Trials No. 8-10)

| Trial No. | Sheet material in the cook (%) | Sheet milling | EA charge (%) | Residual EA (g/l) |
|---|---|---|---|---|
| 8 | 0 | — | 20 | 9 |
| 9 | 30 | Wiley mill | 23 | 9 |
| 10 | 30 | Hammer mill | 23 | 9 |

TABLE 7

Characteristics of the pulps produced in Trials No. 8-10

| Trial No. | Kappa number | Viscosity (dm³/kg) | Klason lignin (%) | Relative carbohydrate composition (%) | | | | |
|---|---|---|---|---|---|---|---|---|
| | | | | Arabinan | Galactan | Glucan | Xylan | Mannan |
| 8 | 27.9 | 1094 | 3.30 | 0.7 | 0.3 | 84.4 | 8.2 | 6.5 |
| 9 | 21.7 | 915 | 2.54 | 0.5 | 0.3 | 88.1 | 6.2 | 4.9 |
| 10 | 20.8 | 904 | 2.36 | 0.5 | 0.3 | 88.7 | 5.8 | 4.7 |

The analyses in Table 7 show that the introduction of milled sheet material to the cook increased the cellulose content of the pulps (increased glucan contents show that). Furthermore, the kappa number decreased. It is also notable that the Klason lignin content decreased when sheet material was added to the cook, which indicates that the pulp was virtually free from any polyester residues, cf. the discussions concerning Klason lignin content in Experiment 2. The cooking results regarding Trials No. 9 and 10 were very much the same, which indicates that the type of milling did not affect the cooking reactions to any large extent. It was, however, expected that the Hammer mill in Trial No. 10 would result in longer fibres that would increase the tearing resistance of handsheets prepared from the pulp. Even though a tendency for higher rearing resistance can be seen for the pulp including sheet material produced in a Hammer mill (Trial No. 10), no astonishing effect was revealed, see Table 8. Nevertheless, the outcome of this trial is that sheet material treated according to one aspect of the present invention can be used in papermaking.

TABLE 8

Tearing resistance of handsheets prepared from pulps prepared in Trials No. 8-10. Three different levels of beating in a PFI-mill was applied for each pulp prior to the hand sheet preparation (0, 2000 and 9000 revs. in the PFI mill)

| Trial No. | Tearing resistance index (Nm²/kg) PFI revolutions | | |
|---|---|---|---|
| | 0 | 2000 | 9000 |
| 8 | 15.8 | 12.2 | 10.5 |
| 9 | 14.9 | 11.9 | 9.8 |
| 10 | 16.1 | 15.1 | 11.1 |

Example 5

Discarded textiles are very seldom made up by a single type of textile fibers and even if e.g. a T-shirt has a tag on it that says that the T-shirt is 100% cotton, the tag itself may contain polyester. Furthermore, in e.g. cotton textiles, many hems and other details are sewn with polyester threads. This means that the use of discarded cellulose textiles for the production of e.g. dissolving pulp, which is a product containing cellulose of high purity, will require separation processes for the removal of also minor amounts of non-cellulosic constituents, such as, polyester threads.

In a separate experiment, a cotton towel cut in pieces (ca 2 cm×2 cm) with a pair of scissors (i.e. "a raw material composition" in accordance with the present invention and "a polyester composition" in accordance with the present invention) was subjected to kraft cooking according to the procedure described in Example 4 with a charge of effective alkali of 8%. Analysis of the spent cooking liquor showed that the concentration of effective alkali decreased from 20 g/l down to 8.5 g/l, which means that the towel consumed 4.6% EA. This alkali consumption was expected, since cellulose is known to undergo some reactions that consume alkali under cooking conditions, cf. e.g. E. Sjöström (1981) "Wood chemistry. Fundamentals and applications" Academic Press, New York. pp 43-46.

Moreover, a visual inspection revealed that the polyester threads in the hems had been completely hydrolyzed during the kraft cooking step. The outcome of this trial is that treatment according to the present invention is very beneficial for upgrading also relatively pure cellulosic fabrics/materials. This means that the present invention is applicable also when the material to be treated contains as little as fractions of one percent of polyester, since such contaminants, if present in e.g. a dissolving pulp, can be expected to cause major process disturbances for the producer of regenerated cellulose fibres.

| Analytical methods used in the examples | |
|---|---|
| Polyester content (i.e. the percentage of the sample not hydrolysed in the analysis) | SS-EN ISO 1833-11:2017 |
| EA (effective alkali) and Sulfidity | SCAN N 30:85 |
| Residual EA | SCAN N 33:94 |
| Kappa number | ISO 302:2012 |
| Klason lignin content | Determined as the solid residue after acid hydrolysis according to Theander, O. and Westerlund, E.A. (1986) J. Agric. Food Chem. 34(2), 55-71 |
| Brightness | SS-ISO 2470-2:2008 |
| Limiting viscosity | ISO 5351:2010 |
| Carbohydrate composition | SCAN CM 71:09 |
| R10 and R18 | ISO 699:2015 |

-continued

| Analytical methods used in the examples | |
|---|---|
| Beating in an PFI mill | SS-EN ISO 5264-2:2011 |
| Handsheet preparation | EN ISO 5269-1:2005 |
| Tearing resistance | SS-EN ISO 1974:2012 |

The invention claimed is:

1. A process for separation of the cellulosic part from a raw material composition comprising polyester and cellulose containing composition, wherein the process comprises
   providing a blend, wherein the blend comprises a raw material composition and a hydrolyzing liquor wherein the blend further comprises a second mixture comprising black liquor comprising an alkaline solution containing hydroxide ions, lignin residues and other dissolved wood components,
   wherein the raw material composition comprises a polyester composition, wherein the polyester composition comprises 99%, or less, by weight of polyester and 1%, or more, by weight of cellulose containing component or components,
   wherein the hydrolyzing liquor comprises a first mixture comprising an alkaline solution which comprises NaOH and NaHS,
   the hydrolyzing liquor is added to give the blend an effective alkali concentration in a range from 5 g/l to 150 g/l, wherein the effective alkali concentration is calculated as NaOH, and
   the hydrolyzing liquor:raw material composition ratio is from 1.5 dm3/kg up to 25 dm3/kg, and
   keeping the blend at a temperature of 100° C. or above.

2. A process for separation according to claim 1, wherein the hydrolyzing liquor is added to give the blend a charge of effective alkali, wherein the charge of effective alkali is calculated as weight of effective alkali (EA)/(dry weight of said "raw material composition" (i.e. dry weight of said "polyester composition", and dry weight of any of said "further cellulose containing components")), and wherein the charge of effective alkali is not more than 100%.

3. A process for separation according to claim 1, wherein the blend is kept at said temperature for at least 5 minutes.

4. A process for separation according to claim 1, wherein the first mixture is added in one step to the raw material composition to provide the blend; or an amount of the first mixture is added in a first step to raw material composition to provide a blend, then further amount, or amounts, of the first mixture is added in a second step, or in a second step and in any further step, to provide the blend.

5. A process for separation according to claim 1, wherein the first mixture comprising an alkaline solution which comprises NaOH, NaHS and $Na_2CO_3$.

6. A process for separation according to claim 1, wherein the cellulose containing component or components, comprise cotton composition, and zero, one, two or more, of lignocellulosic composition, cellulose composition, regenerated cellulosic fibres composition and flax composition.

7. A process for separation according to claim 1, wherein the process for separation further comprises a step, or steps, of physically separating the cellulosic part.

8. A process for separation according to claim 1, wherein the process for separation is a continuous process, a batch process, or any combination of continuous processes and batch processes.

9. A process for separation according to claim 1, wherein the polyester composition is a polycotton composition and wherein the raw material composition further comprises zero, one or two of further cellulose containing components, for example, zero, one, or two of lignocellulosic composition, cellulose composition, regenerated cellulosic fibres composition and flax composition.

10. A process for separation according to claim 1, wherein the process for separation is integrated into an alkaline pulping process.

* * * * *